US012043435B1

(12) United States Patent
Kaminski

(10) Patent No.: US 12,043,435 B1
(45) Date of Patent: Jul. 23, 2024

(54) PACKING MACHINE FOR INFLATABLE BAGS

(71) Applicant: Michael G Kaminski, Las Vegas, NV (US)

(72) Inventor: Michael G Kaminski, Las Vegas, NV (US)

( * ) Notice: Subject to any disclaimer, the term of this patent is extended or adjusted under 35 U.S.C. 154(b) by 64 days.

(21) Appl. No.: 17/950,544

(22) Filed: Sep. 22, 2022

Related U.S. Application Data

(60) Provisional application No. 63/247,162, filed on Sep. 22, 2021.

(51) Int. Cl.
*B65B 41/04* (2006.01)
*B31D 5/00* (2017.01)
*B65B 43/12* (2006.01)
*B65B 55/20* (2006.01)

(52) U.S. Cl.
CPC ............ *B65B 55/20* (2013.01); *B31D 5/0073* (2013.01); *B65B 41/04* (2013.01); *B65B 43/123* (2013.01)

(58) Field of Classification Search
CPC .... B31D 5/0073; B65D 81/052; B65D 81/03; B65B 55/20; B65B 7/14; B65B 41/04; B65B 41/14; B65B 43/123; B65B 43/16; B65B 43/465
USPC .................. 53/79, 403, 472; 206/522; 383/3
See application file for complete search history.

(56) References Cited

U.S. PATENT DOCUMENTS 4,021,283 A * 5/1977 Weikert ................ B65B 55/103 156/244.14
6,876,107 B2 * 4/2005 Jacobs .............. B29C 66/83413 318/135
7,578,333 B2 * 8/2009 Greenwood .............. B65B 1/02 156/147
8,567,159 B2 * 10/2013 Sperry ................. B65D 81/052 53/558
10,850,906 B2 * 12/2020 Eckel ................... B31D 5/0073
2002/0166788 A1 * 11/2002 Sperry .................. B29C 66/439 383/3
2012/0214658 A1 * 8/2012 Chuba ..................... B65B 49/16 493/405
2013/0152516 A1 * 6/2013 Sammons ................. B65B 7/02 53/562
2014/0130461 A1 * 5/2014 Johan .................... B65B 43/123 53/284.7
2017/0144402 A1 * 5/2017 Liao ....................... B65D 31/14
2017/0225813 A1 * 8/2017 Wehrmann .............. B65B 55/20
(Continued)

*Primary Examiner* — Joshua G Kotis
(74) *Attorney, Agent, or Firm* — Barry Choobin; Patent 360

(57) ABSTRACT

A packing machine and a method of use thereof for packing articles in airbags. The packing machine includes three consecutive stations that can receive airbags in a series of airbags one by one, wherein the article to be packed is placed in the airbag. The first station can receive a new bag containing the article. In the first station, the airbag can be horizontally sealed at the top to close the opening and can then be inflated. In the second station and the third station, the airbag can be vertically sealed and can then be dropped into a conveyor at the end of the third station. An air tube that extends between the first station and the second station can be used to inflate the airbags. Two linear actuators with gripping heads can move the airbags from between stations, and break the leading airbag from the series of airbags.

10 Claims, 3 Drawing Sheets

(56) References Cited

U.S. PATENT DOCUMENTS

2019/0233152 A1* 8/2019 Nakamoto .............. B65B 51/32
2019/0263081 A1* 8/2019 Wehrmann .............. B65B 43/42

* cited by examiner

PACKING MACHINE FOR INFLATABLE BAGS

CROSS-REFERENCE TO RELATED APPLICATIONS

This application claims priority from a U.S. Provisional Patent Appl. No. 63/247,162 filed on Sep. 22, 2021, which is incorporated herein by reference in its entirety.

FIELD OF INVENTION

The present invention relates to the packing machine, and more particularly, the present invention relates to a packing machine for packing articles in inflatable bags.

BACKGROUND

Packing is a means to protect an article from contamination, dirt, and damage. The packaging is of utmost significance in the manufacture, sale, and transport of articles. The primary purpose of the packing is to protect an article from the environment. For example, packing can protect an article from dust, water, etc. Also, the packing has the primary function to protect an article from external shocks and bumps. This function of packing is of importance in the transportation of fragile articles which are very suspectable to damage during transportation. Good packing can protect an article from damage due to shocks or bumps both during transportation and mishandling of the article.

Different kinds of packing materials are commercially available, such as paper, plastic, and cardboard. Each packing material has its own uses and indications. Paper can be used to protect an article from dirt. Plastic can protect an article from both dirt and liquid. Cardboard, on the other hand, are sturdy and can provide limited protection against shocks. For enhanced protection against shocks, materials such as Styrofoam®, foam, bubble packs, crumpled paper, or airbags, each being inserted inside a bag or container are popularly used.

Airbags are bags that can be inflated to protect an article contained in the bag. The airbag is made of polyethylene or other materials having similar properties. The airbag is manufactured as a sheet having two overlapping plies. The two plies have air cavities that are inflated with air. The air cavities are fluidly connected to an inflation port through unidirectional flow valves and inflatable tubes. The air enters from the inflation port and uniformly distributes to the plurality of inflatable cavities. The unidirectional flow valves provided at the inflation port prevent the leaking of air. The airbags are available in the form of a container. For example, airbag containers are used to contain glass bottles for protection against bumps. Such airbag containers have become quite popular for the transportation of wine bottles.

Packing several articles in airbags, such as on a commercial scale, can be a laborious and time-consuming process. First, the bag has to be inflated, then an article is put into the inflated bag followed by sealing the airbag.

A need is therefore appreciated for a packing machine that can automate the aforesaid steps in the inflatable packing of articles.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an automated packing machine for packing articles in inflatable airbags.

It is another object of the present invention that the packing machine can provide for the sealing, inflating, and separation of airbags.

It is still another object of the present invention that the packing machine can significantly decrease the labor and time for packaging.

It is a further object of the present invention that the packing machine is economical to set up and operate.

It is yet another object of the present invention that the packing machine can take a continuous sheet of airbags.

In one aspect, disclosed are a packing machine and a method of use thereof for packing articles in airbags, the airbags have multiple inflatable tubes arranged side-by-side, the packing machine comprises a frame, the frame divided into three consecutive stations, i.e., a first station, a second station, and a third station, each of the first station, the second station, and the third station has a proximal end and a distal end, the distal end of the first station is adjacent the proximal end of the second station, the distal end of the second station is adjacent the proximal end of the third station; an air tube horizontally mounted within the frame, the air tube extends from proximal end of the first station up to the distal end of the second station; a rail that extends from the proximal end of the first station and extends further from the distal end of the third station; a left linear actuator and a right linear actuator mounted to the rail, the left linear actuator and the right linear actuator are configured to independently move left to right and right to left on the rail, each of the left liner actuator and the right linear actuator has a gripping head positioned just above the air tube, wherein the gripping heads of the left linear actuator and the right linear actuator are configured to grab overlapping two flaps of a folded sheet of airbags, the two flaps surrounds the air tube, the folded sheet of airbags has a series of consecutive airbags separated by margins, an onboard controller configured to control an operation of the left linear actuator and the right linear actuator; and a horizontal sealer mounted to the frame at the first station, the horizontal sealer configured to seal a portion of the two flaps above the air tube, wherein each station of the first station, the second station, and the third station is configured to receive airbags of the folded sheet of airbags one-by-one, and the left linear actuator and the right linear actuator are configured to move the folded sheet of airbags between the first station, the second station, and the third station.

In one implementation, the air tube has a proximal end and a distal end, the proximal end of the air tube is in fluid communication with a compressed air source and a distal end of the air tube is closed, the air tube has a series of spaced apart apertures for filling inflatable tubes. The packing machine further comprises an onboard computer configured to operate the left linear actuator and the right linear actuator. The packing machine further comprises a vertical sealer disposed in the third station that extends into the second station, wherein the vertical sealer is configured to seal a common margin of two adjacent airbags in the series of consecutive airbags. The packing machine further comprises a V-shape sealer disposed in the third station that extends into the second station, wherein the V-shape sealer is configured to seal a portion of the two flaps of two adjacent airbags in the series of consecutive airbags that is above the margins. The left linear actuator is configured to pull a leading airbag from an adjacent airbag resulting in tearing of a line of weakness separating the leading airbag from the adjacent airbag.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
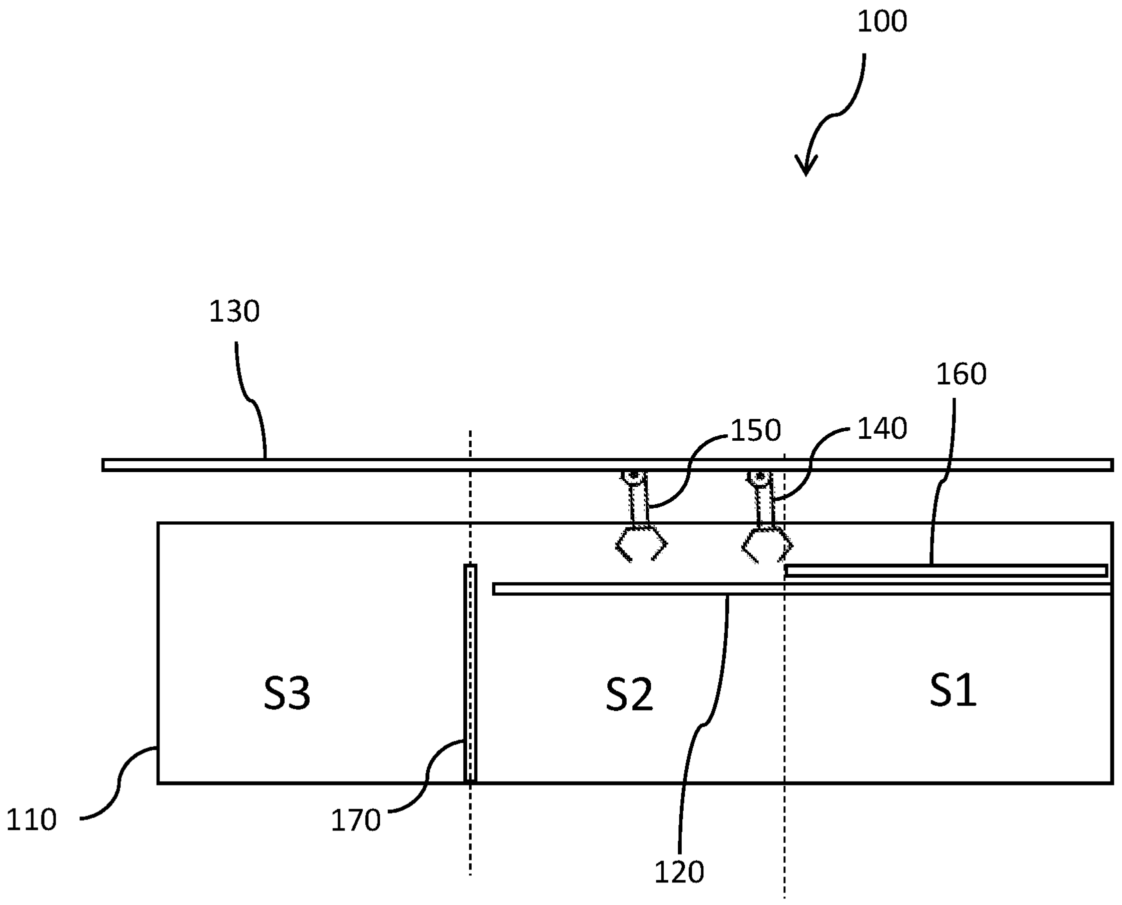
FIG. 1 is a block diagram of a packing machine, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Disclosed is a packing machine for automated sealing, inflating, and separating airbags from a series of airbags. The disclosed packing machine can intake a sheet from a roll or stack of inflatable packing bags. The disclosed packing machine can inflate airbags one by one in the sheet, provide for horizontal and vertical sealing, perforate the sheet, and separate the packed article in the airbag along the perforations. The disclosed packing machine can provide for inflating an airbag containing an article followed by sealing the opening. Disclosed is a packing machine for packing articles in airbags. The disclosed packing machine can be adapted for packing several types of articles, such as cups, showpieces, and the like.

Referring to FIG. 1 is a block diagram illustrating the disclosed packing machine 100. The packing machine, for illustration, can be assumed to be divided into three stages, also referred to herein as stations i.e., S1, S2, and S3. Broken vertical lines in FIG. 1 show the separation of three stations. The disclosed packing machine can include a frame 110 to which different components of the disclosed packing machine can be mounted. The frame can also support the disclosed packing machine on a floor or similar surface. The frame can be made from durable metal bars and sheets. It is understood, however, that a different construction of the frame is within the scope of the present invention. The disclosed packing machine may further include an air tube 120 that can be horizontally mounted. The air tube can be of an elongated and cylindrical profile that has a proximal end and a distal end. The proximal end of the air tube can be closed, while the distal end can be in fluid communication with a compressed air source, such as an air compressor. The air tube can have a plurality of spaced-apart apertures at the bottom of the air tube that point in a downward direction. The air under pressure from the air compressor blows through these apertures into inflatable tubes of the airbag. It is understood, however, that the number of apertures and the position of apertures can be varied without departing from the scope of the present invention. Preferably, the position and angle (direction) of apertures can be varied for optimum filling of the inflatable tubes of the airbags. Moreover, any other filling mechanism for inflatable packing bags is within the scope of the present invention. The compressed air source may also allow adjusting the pressure of the compressed air.

The terms "inflatable packing bag", "inflatable bag", "packaging bag", and "airbag" are interchangeably used herein and generally refer to an airbag that has elongated inflatable tubes. The airbag can have a front wall and a rear wall, the front wall and the rear wall can include a series of inflatable tubes of prolonged cylindrical configurations that are arranged side by side. The airbag can be of a gusset profile wherein the inflated tubes are folded to form a gusset airbag. Each inflatable tube can have an opening, preferably at its end. For example, the opening can be in the form of a slit or aperture through which air under pressure can be drawn into the inflatable tube resulting in its inflation. The opening of each inflatable tube can be interrupted by a check valve. The check valve, also known as a one-way valve, can be configured at the opening of each of the inflatable tubes to allow the air to fill into the tubes but does not allow the filled air from the tubes to leak out through the opening. The use of a check valve is advantageous in prolonging the life of the airbag and limiting the spread of any damage to the functional portion of the airbag. This is because any leaked tube will not result in the deflation of the whole airbag. Thus, one or two damaged tubes will not deflate the undamaged part of the airbag. It is to be understood, however, that a different airbag is within the scope of the present invention. The arrangement, shape, and type of inflatable tubes can be varied without departing from the scope of the present invention.

An uninflated sheet containing several consecutive air cavities can be fed into the disclosed packing machine. The airbags can be manufactured from two plies that can be bonded together to form a sheet that includes inflatable tubes that run side-by-side consecutively along the length of the sheet. A space can separate inflatable tubes of two adjacent airbags, and this space is referred to herein as a margin. Thus, each airbag in the sheet can have a left margin and a right margin. The sheet can be folded at the mid-gusset point and the margins can be sealed to form the airbags. Two flaps can be present on opposite sides of the sheet, wherein the two flaps run parallel to each other along the length of the sheet. The inflatable tubes traversely extend between the two flaps. The two flaps can be similar to margins, and when the sheet is folded, the two flaps can overlap. The two flaps form an opening of the airbag when the sheet is folded, and the margins are sealed. The two flaps of the airbag can be overlaid on the air tube near its proximal end, such that the air tube is sandwiched between the first flap and the second flap. The apertures of the air tube point to the openings of the inflatable tubes and blow air into the openings. The air under pressure can inflate the inflatable tubes while the check valve prevents the air from leaking out of the openings.

In one implementation, the sheet can be folded but without sealing the margins and such a sheet can be fed into the packing machine. Alternatively, the sheet can be folded, and the margins can be sealed, and such a sheet can be fed into the packing machine. In both cases, the top of the airbag, i.e., the two flaps can remain open to access the inner volume of the airbag. Each airbag in the series of consecutive airbags in the sheet can also be referred to herein as a unit. Optionally, each unit in the roll or stack of sheets can be divided from adjacent units by a line of weakness, such that a unit can be torn from its adjacent airbag along with the line of weakness. In one case, the line of weakness can be spaced perforations. Alternatively, the line of weakness can be made in situ by the disclosed packing machine for separating the packed articles.

Referring again to FIG. 1, the air tube 120 can extend from the first station S1 nearly up to the end of the second station S2. The disclosed packing machine can further include a rail 130 that runs along an entire length of the packing machine and can extend further from the end of station S3. Two robotic linear actuators i.e., a right actuator 140 and a left actuator 150 can be mounted on the rail 130. The two robotic linear actuators can independently move on the rail from left to right and from right to left. Suitable precision motors can be provided for actuating the robotic linear actuators. A range of sensors can be provided on the air tube, airbags, and the like using which the movement of the robotic linear actuators can be controlled. For example, bag position sensors and bag optical position marks can be provided for tracking the operation of the packing machine. The disclosed packing machine can include a central processing unit, also referred to herein as an onboard computer (OBC) or a control unit. Additionally, suitable software and modules can be configured in the OBC that allows the OBC to make individual decisions on the precise positioning of each airbag as it is processed. The OBC can receive inputs from the different sensors and accordingly can operate the two robotic linear actuators. The two robotic linear actuators can be individually operated, the two robotic linear actuators can move in either direction independently from each other. For example, the left actuator can move left to right and then right to left, while the right actuator remains stationary. Each of the two robotic linear actuators can have a gripping head that can grip the two flaps of the folded sheet for dragging the folded sheet from one station to the next station and finally to the conveyor or bin.

The packing machine 100 can further include a horizontal sealer 160 mounted just above the air tube in the first station. The horizontal sealer can seal the two flaps above the air tube when the airbag arrives at station S1. An article to be packed can be dropped in the airbag through its top opening before the airbag enters the first station S1. In one implementation, the horizontal sealer 160 can heat seal the two flaps.

The packing machine can further include a vertical sealer 170 that may be vertically oriented and configured to seal the margins of the folded sheet. The vertical sealer 170 can be positioned between the second station S2 and the third station S3. As shown in FIG. 1, there could be some space between the air tube and the vertical sealer. In case, the folded sheet is already sealed at the margins, a V-shape sealer can be provided to seal the unsealed portion of the two flaps i.e., the portion of the flaps above the margins. Some space may be left between the vertical seal of the margins and the horizontal seal made by the horizontal sealer 160, this space can be sealed by the V-sealer. Along the vertical sealer can also be provided a perforator blade that can make a traversing line of weakness in the margins. However, such functionality may not be needed if the line of weakness is already there in the series of the bag.

Figure 2A:
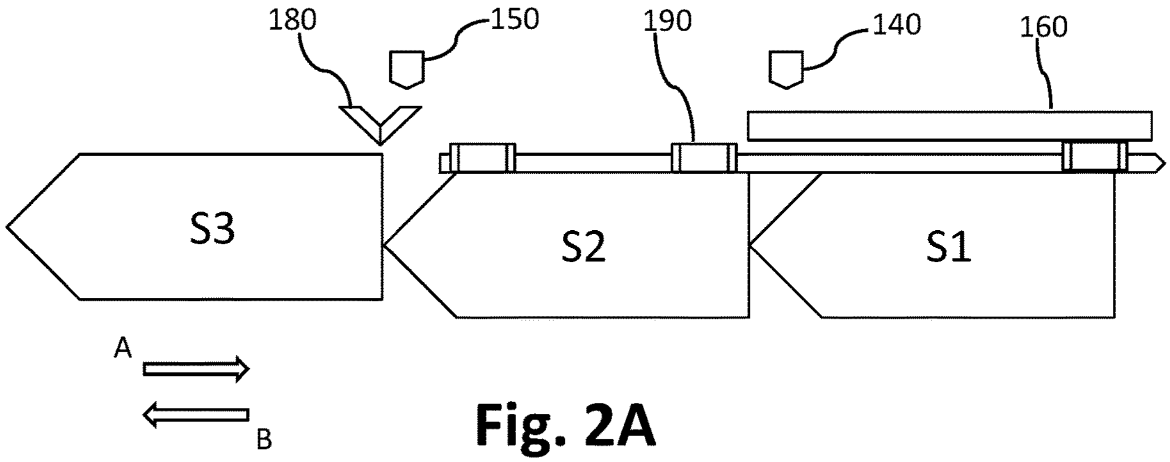
FIG. 2A, FIG. 2B, and FIG. 2C are schematic diagrams showing the operation of the packing machine, according to an exemplary embodiment of the present invention.
Figure 2B:
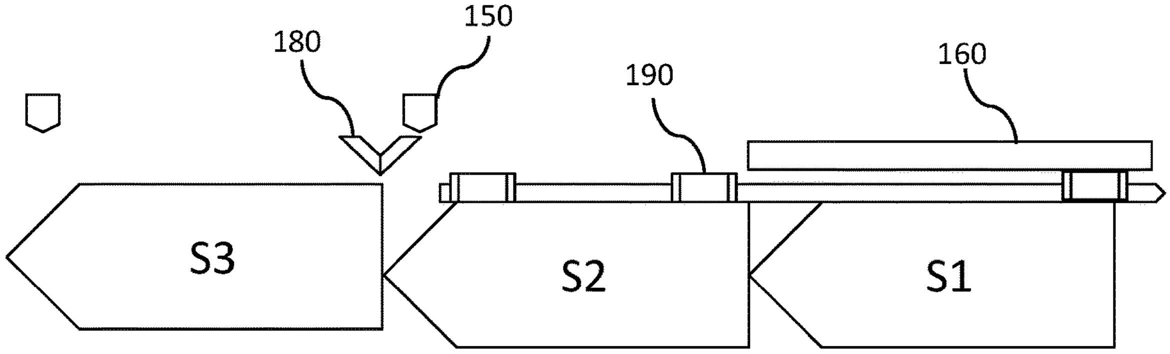
Figure 2C:
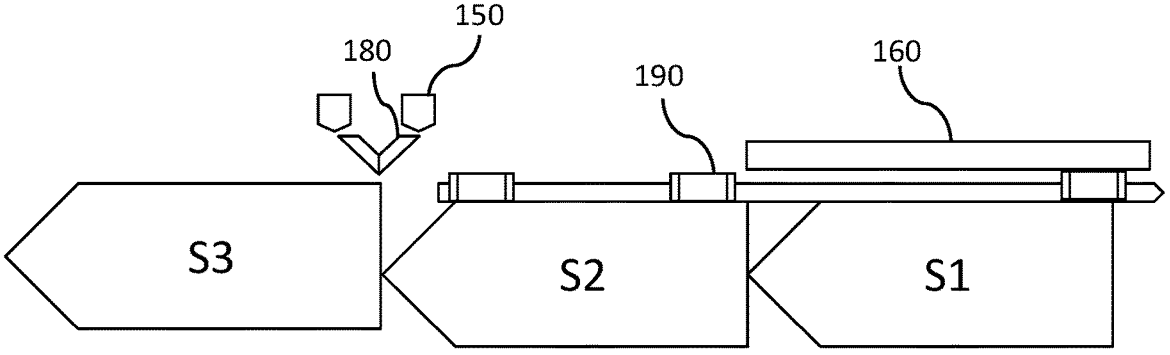

Referring to FIGS. 2A to 2C illustrate a method of operating the disclosed packing machine. FIG. 2A shows a V-sealer 180 instead of the vertical sealer 170 shown in FIG. 1. It is understood that only one sealer may be present. FIG. 2A also shows three pairs of idler rollers 190 that may support the air tube and can also limit the flow of compressed air up to the desired length of the air tube.

First, a series of airbags as a folded sheet can be fed into the disclosed packing machine. The series of airbags can be fed through a roller or similar apparatus such that slight tension can be maintained in the series of airbags being fed into the packing machine. The two flaps can be overlaid on the air tube 120 at the proximal end and the leading corner of the folded sheet can be grabbed by the right actuator 140. An article to be packed can be dropped into the first airbag, which is a leading airbag, before entering station S1 of the packing machine. The right actuator 140 can drag the leading corner up to a distal end of S1, such that the first airbag is within the station S1. The horizontal sealer 160 can be actuated to seal the two flaps of the first airbag. Upon sealing, the first airbag can be inflated by blowing air through the air tube 120. Once inflated, the left actuator or the right actuator can further drag the leading corner up to the distal end of the second station, such that the leading airbag enters the second station while the next airbag enters the first station. In the drawings, the new airbag enters station S1 at its proximal end, the proximal end of S2 and the distal end of S1 are adjacent to each other, and the proximal end of S3 and the distal end of S2 are adjacent to each other. It is to be noted that an airbag can receive the article to be packed before entering the first station. The article can be manually put into the airbag or the process of putting the article into the airbag can be automated. For example, a user can manually open the airbag by separating the two flaps space apart and thereafter putting the article into the airbag. In place of manually opening the airbag, the process can be automated wherein a mechanical arm can be provided that causes the bag to open. Also, the process can be continuous wherein the airbags having the articles get fed into the packing machine autonomously. Alternatively, the process may not be continuous, and manual intervention may be needed before the next airbag enters the first station S1. For example, a hand-operated button or foot-operated pedal can be provided which can be actuated to cause the actuators to pull the next airbag into the first station S1.

When the first airbag is in the second station, the two actuators can move to positions as shown in FIG. 2*a*. Both the horizontal sealer and the V-sealer can be actuated at once, causing the horizontal seal in the flaps of the second airbag at the first station S1 and the V-sealing of the leading edge of the first airbag in the second station S2. Thereafter, the second airbag in the first station S1 can be inflated, and then the two actuators can further drag the airbags, wherein the first airbag moves to S3 and a third airbag enters S1. The current position of the two actuators is shown in FIG. 2*b*. Now the sealers can be actuated again, resulting in the sealing of the trailing edge of the first airbag and the leading edge of the second airbag by the V-sealer, and horizontal sealing of the flaps of the third airbag by the horizontal sealer. Once sealed, the left actuator can move up to the proximal end of S3, as shown in FIG. 2*c*. It can then grab the sealed flaps of the first airbag, and then move back towards the distal end of S3, wherein the left actuator pulls the first airbag resulting in tearing along the line of weakness and separating of the first airbag from the second airbag. The left actuator can carry the first airbag further passing the S3 and dropping the first airbag at the end of the S3. A conveyor can be provided at the end of S3 onto which the packed airbag can be dropped by the left actuator 150. Alternatively, a container can be provided into which the airbags can be collected. Or the actuator can drop the airbag on the floor from where it can be collected.

Once the first airbag is dropped, the two actuators can move to positions as shown in FIG. 2*a*. The third airbag can be filled with air during this time i.e., time from sealing the third airbag. Now the second airbag can be moved to S3 and the third bag moves to S2 and a fourth airbag enters S1. The sealers can be actuated, resulting in the sealing of the trailing edge of the second bag, a leading edge of the third airbag, and the horizontal sealing of the fourth airbag. The process can be repeated, wherein the second airbag is torn from the third airbag and dropped on the conveyor while the fourth airbag can be filled. The third airbag can be moved to S3 and a fifth airbag can enter S1.

The movement of the airbags, the top horizontal seal, and inflation, wherein additional linear actuators are actuated to prevent the air from escaping the inflation process, the whole process is controlled by the combination of sensors, optical marks or holes on the bags, and the independent movement of the linear actuators via on-board software and controllers. The sealing and inflation result in the deformation of the airbags and such changes can be accounted for by the onboard software and controllers, in near real-time.

In one aspect, the tearing of the airbag from adjacent airbags can be performed by the participation of both actuators. For example, the left actuator can move while the right actuator can be stationary grabbing the flaps of the adjacent airbag. Alternatively, the left actuator and the right actuator can move in the opposite direction. It is understood that the right actuator can move a short distance just to initiate the perforation break. Each linear actuator is guided by data collected by the optical sensors and these linear actuators can and do operate independently based on signals from the onboard computers. At the same time, once the exiting bag is separated from the chain of bags, it is held in suspension by another actuator until the perforation rip is complete, and then the sealed and printed bag is released to the conveyor below which carries it to the mailing operation. Each of these steps is managed and guided by a combination of sensors used to precisely position each bag for the process performed at each station. When the bags inflate, the overall length of each bag changes sometimes by one or two cm due to the shape and position of the item inserted in the bag. To manage accurate positioning, the robotic linear actuators grasp the bags along the top edge and move them to a precise position guided and based on the optical sensors observing optical marks or holes in or on the bag.

Figure 3:
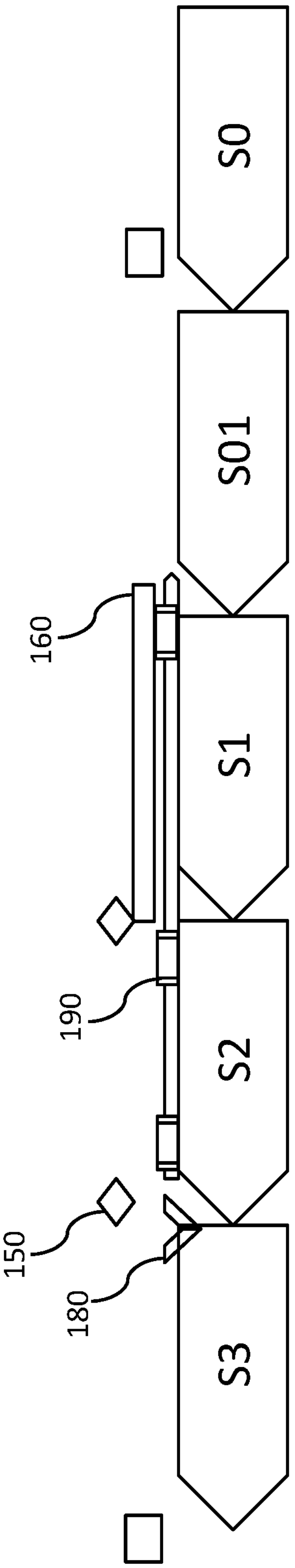
FIG. 3 is a schematic diagram showing an alternate embodiment of the packing machine, according to the present invention.

Referring to FIG. 3 shows additional functionality coupled to the disclosed packing machine. FIG. 3 shows two additional stations S0 and S01 before S1. When an item to be bagged arrives at the packing machine via the input conveyor, a bar or QR code on the item can be read and the information can be displayed on the operator's monitor. At the same time, the bag that will receive that item can be printed with the bar or QR code of the respective item, at station S0. This code can be later used to print mailing or storage information on the bag, box, or sleeve. The code can be used to keep track of articles during the process and after the process. As the item exits the machine it is ready for a final read of the bar or QR code to ensure that the item in the bag based on visual inspection or data the machine has for the contents matches the information provided by the exterior code. This feature may be important for compliance with aerospace and defense applications and to ensure a customer is getting the correct item. At station S01, the item can be dropped into the respective bag. A bag opener can be provided in the S01, which could be a mechanical device shaped to separate the two flaps of the airbag space apart.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A packing machine for packing articles in airbags, the airbags have multiple inflatable tubes arranged side-by-side, the packing machine comprises:

a frame, the frame divided into three consecutive stations including a first station, a second station, and a third station, wherein each of the first station, the second station, and the third station has a proximal end and a distal end, the distal end of the first station is adjacent the proximal end of the second station, the distal end of the second station is adjacent the proximal end of the third station;

a filling station located upstream from the first station for depositing the articles within a respective bag of the airbags;

an air tube horizontally mounted within the frame, the air tube extends from proximal end of the first station up to the distal end of the second station;

a rail that extends from the proximal end of the first station and extends further from the distal end of the third station;

a left linear actuator and a right linear actuator mounted to the rail, the left linear actuator and the right linear actuator are configured to independently move left to right and right to left on the rail, each of the left linear actuator and the right linear actuator has a gripping head positioned above the air tube, wherein the gripping heads of the left linear actuator and the right linear actuator are configured to grab overlapping two flaps of a folded sheet of airbags, the two flaps surround the air tube, the folded sheet of airbags has a series of consecutive airbags separated by margins, an onboard controller configured to control an operation of the left linear actuator and the right linear actuator; and a horizontal sealer mounted to the frame at the first station, the horizontal sealer configured to seal a portion of the two flaps above the air tube, wherein each station of the first station, the second station, and the third station is configured to receive airbags of the folded sheet of airbags one-by-one, and the left linear actuator and the right linear actuator are configured to move the folded sheet of airbags between the first station, the second station, and the third station.

2. The packing machine according to claim 1, wherein the air tube has a proximal end and a distal end, the proximal end of the air tube is in fluid communication with a compressed air source and the distal end of the air tube is closed, the air tube has a series of spaced apart apertures for filling inflatable tubes.

3. The packing machine according to claim 1, wherein the packing machine further comprises:

a vertical sealer disposed in the third station that extends into the second station, wherein the vertical sealer is configured to seal a common margin of two adjacent airbags in the series of consecutive airbags.

4. The packing machine according to claim 1, wherein the packing machine further comprises:

a V-shape sealer disposed in the third station that extends into the second station, wherein the V-shape sealer is configured to seal a portion of the two flaps of two adjacent airbags in the series of consecutive airbags that is above the margins.

5. The packing machine according to claim 1, wherein the left linear actuator is configured to pull a leading airbag from an adjacent airbag resulting in tearing of a line of weakness separating the leading airbag from the adjacent airbag.

6. A method of packing articles in airbags, the airbags have multiple inflatable tubes arranged side-by-side, the method comprises:

providing a packing machine comprising:

a frame, the frame divided into three consecutive stations including a first station, a second station, and a third station, wherein each of the first station, the second station, and the third station has a proximal end and a distal end, the distal end of the first station is adjacent the proximal end of the second station, the distal end of the second station is adjacent the proximal end of the third station;

a filling station located upstream from the first station for depositing the articles within a respective bag of the airbags;

an air tube horizontally mounted within the frame, the air tube extends from proximal end of the first station up to the distal end of the second station;

a rail that extends from the proximal end of the first station and extends further from the distal end of the third station;

a left linear actuator and a right linear actuator mounted to the rail, the left linear actuator and the right linear actuator are configured to independently move left to right and right to left on the rail, each of the left linear actuator and the right linear actuator has a gripping head positioned above the air tube, wherein the gripping heads of the left linear actuator and the right linear actuator are configured to grab overlapping two flaps of a folded sheet of airbags, the two flaps surround the air tube, the folded sheet of airbags has a series of consecutive airbags separated by margins, an onboard controller configured to control an operation of the left linear actuator and the right linear actuator; and a horizontal sealer mounted to the frame at the first station, the horizontal sealer configured to seal a portion of the two flaps above the air tube, wherein each station of the first station, the second station, and the third station is configured to receive airbags of the folded sheet of airbags one-by-one, and the left linear actuator and the right linear actuator are configured to move the folded sheet of airbags between the first station, the second station, and the third station;

receiving the airbags as the folded sheet by the packing machine; and packing one or more articles of the articles in one or more airbags of the airbags.

7. The method according to claim 6, wherein the air tube has a proximal end and a distal end, the proximal end of the air tube is in fluid communication with a compressed air source and the distal end of the air tube is closed, the air tube has a series of spaced apart apertures for filling inflatable tubes.

8. The method according to claim 6, wherein the packing machine further comprises:

a vertical sealer disposed in the third station that extends into the second station, wherein the vertical sealer is configured to seal a common margin of two adjacent airbags in the series of consecutive airbags.

9. The method according to claim 6, wherein the packing machine further comprises:

a V-shape sealer disposed in the third station that extends into the second station, wherein the V-shape sealer is configured to seal a portion of the two flaps of two adjacent airbags in the series of consecutive airbags that is above the margins.

10. The method according to claim 6, wherein the left linear actuator is configured to pull a leading airbag from an adjacent airbag resulting in tearing of a line of weakness separating the leading airbag from the adjacent airbag.

* * * * *